United States Patent
Stockton

(10) Patent No.: US 8,627,624 B2
(45) Date of Patent: Jan. 14, 2014

(54) DECK DRAINAGE SYSTEM

(76) Inventor: E. Allan Stockton, Mineola, TX (US)

( * ) Notice: Subject to any disclaimer, the term of this patent is extended or adjusted under 35 U.S.C. 154(b) by 596 days.

(21) Appl. No.: 12/418,081

(22) Filed: Apr. 3, 2009

(65) Prior Publication Data

US 2009/0266018 A1 Oct. 29, 2009

Related U.S. Application Data

(60) Provisional application No. 61/041,975, filed on Apr. 3, 2008.

(51) Int. Cl.
*E04F 17/00* (2006.01)
*E04B 1/70* (2006.01)

(52) U.S. Cl.
USPC ........ 52/302.3; 52/302.6; 52/506.01; 52/468; 52/478

(58) Field of Classification Search
USPC .......... 52/302.1, 302.3, 302.6, 222, 478, 480, 52/650.3, 533, 506.05, 749.1, 750, 468, 52/506.01, 748.1
See application file for complete search history.

(56) References Cited

U.S. PATENT DOCUMENTS

| | | | | |
|---|---|---|---|---|
| 1,928,589 | A | * | 9/1933 | Earley ........................... 52/302.6 |
| 2,112,936 | A | * | 4/1938 | Sway ............................... 52/408 |
| 3,066,771 | A | * | 12/1962 | Wolchuk ........................ 52/478 |
| 4,065,883 | A | * | 1/1978 | Thibodeau ....................... 52/11 |
| 4,373,315 | A | * | 2/1983 | Farrant ........................... 52/522 |
| 4,663,894 | A | * | 5/1987 | LaRoche et al. .................. 52/15 |
| 4,817,343 | A | * | 4/1989 | Rutledge ........................... 52/22 |
| 5,195,281 | A | * | 3/1993 | Kosko ............................... 52/11 |
| 5,765,328 | A | * | 6/1998 | Moore ......................... 52/302.1 |
| 5,921,038 | A | * | 7/1999 | Burroughs et al. ............. 52/209 |
| 6,164,019 | A | * | 12/2000 | Salley ............................... 52/11 |
| 6,226,956 | B1 | * | 5/2001 | Davis et al. ................ 52/745.06 |
| 6,260,316 | B1 | * | 7/2001 | Davis et al. .................. 52/302.3 |
| 6,279,271 | B1 | * | 8/2001 | Burkart, Jr. ....................... 52/11 |
| 6,357,183 | B1 | * | 3/2002 | Smith ............................... 52/15 |
| 6,385,931 | B1 | * | 5/2002 | Risser ......................... 52/302.1 |
| 6,415,571 | B2 | * | 7/2002 | Risser ......................... 52/302.1 |
| 6,421,967 | B1 | * | 7/2002 | Wlaker .......................... 52/198 |
| 6,688,059 | B1 | * | 2/2004 | Walker ........................ 52/302.3 |
| 6,694,686 | B2 | * | 2/2004 | Ready et al. ................. 52/302.1 |
| 6,796,092 | B1 | * | 9/2004 | Goebel ........................ 52/302.1 |
| 6,886,302 | B2 | * | 5/2005 | Jackson ....................... 52/302.3 |
| 7,051,485 | B2 | * | 5/2006 | Burnette .......................... 52/578 |
| 7,818,922 | B2 | * | 10/2010 | Ellis ................................ 52/95 |
| 7,918,060 | B2 | * | 4/2011 | Gobeil ......................... 52/302.3 |
| 7,950,201 | B1 | * | 5/2011 | Adair et al. .................. 52/748.1 |
| 2003/0074850 | A1 | * | 4/2003 | Ready et al. ................. 52/302.1 |
| 2004/0231260 | A1 | * | 11/2004 | Burkart ....................... 52/302.1 |

\* cited by examiner

*Primary Examiner* — Phi A

(74) *Attorney, Agent, or Firm* — Howison & Arnott, L.L.P.

(57) ABSTRACT

An elongate channel insert configured for installation between elongate structural members to prevent water from flowing through an overlying structure into the area beneath the structural members includes a U-shaped hook on a first side of the insert that goes over the top and both sides of a joist, an L-shaped ledge on the other side of the channel insert prevents the inserts from becoming off center as they are placed side by side on joists across the entire width of a deck with the base of the insert angled along its length such that water captured within the channel will drain from one end of the insert to the other.

13 Claims, 5 Drawing Sheets

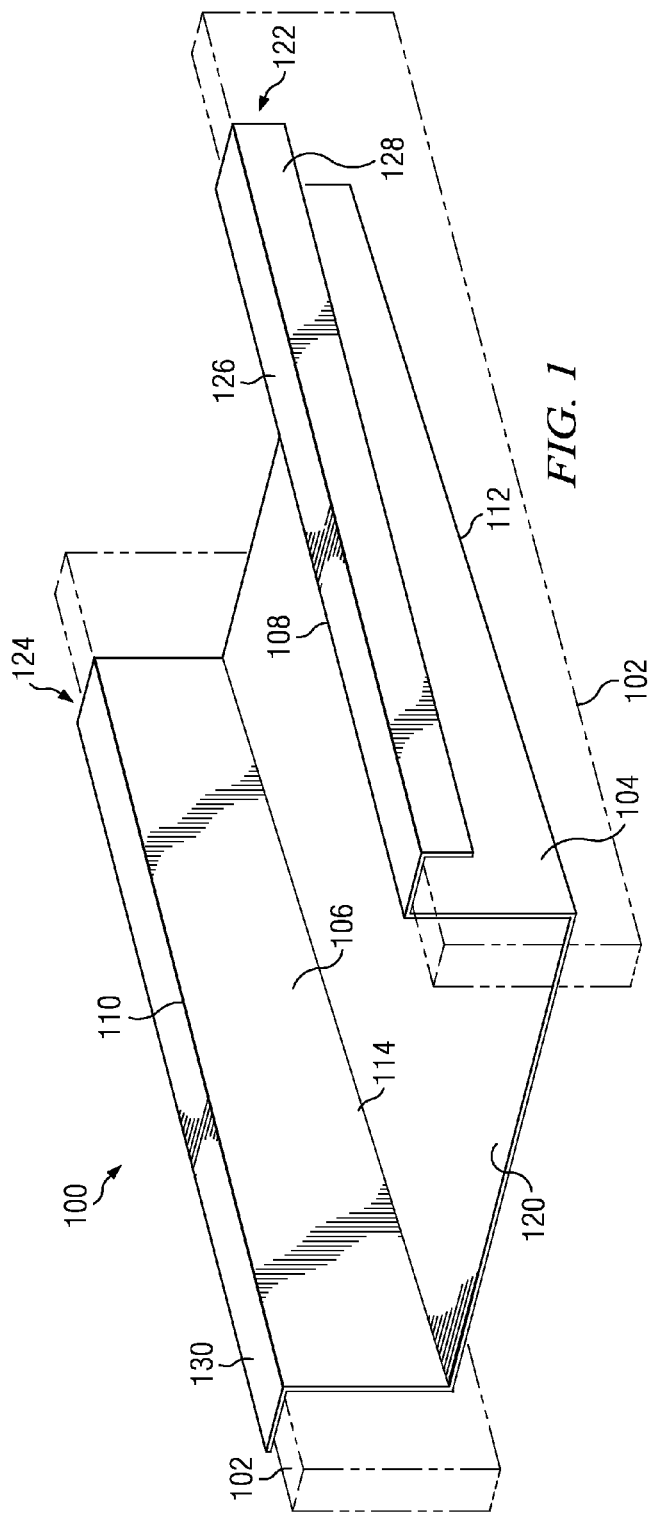
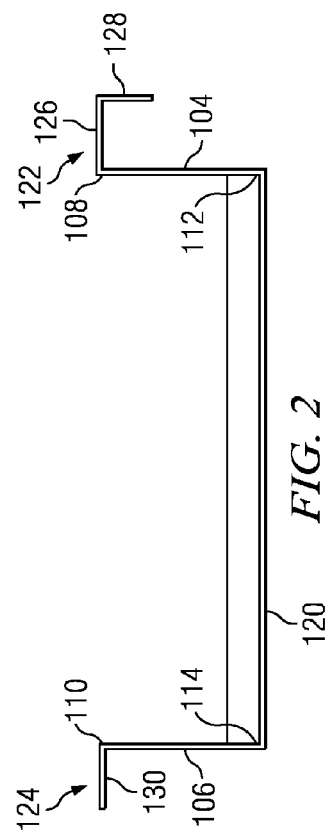
FIG. 1
FIG. 2

DECK DRAINAGE SYSTEM

CROSS-REFERENCE TO RELATED APPLICATIONS

This application claims benefit of U.S. Provisional Patent Application No. 61/041,975, filed Apr. 3, 2008, and entitled DECK DRAINAGE SYSTEM, which is incorporated herein by reference.

TECHNICAL FIELD

The disclosure related to a channel insert, pilot tool, system and method for providing drainage between elongate structural members such as the joists of an outdoor deck to prevent water from entering the area below a structure.

BACKGROUND

Outdoor decks and similar structures are often constructed from elongate support members such as wooden joists over which a decking material is placed. In many instances, the space beneath such decks and similar structures does not provide usable storage room due to water leakage through the decking material during rainstorms or when accumulated snow and ice on the deck melts. Thus, there exists a need for a system, tools and a method for diverting water that may leak though a deck, roof or similar structure from leaking through the structure to the area beneath the structure.

SUMMARY

In one embodiment, a channel insert is configured for installation between elongate structural members to prevent water from flowing through an overlying structure into the area beneath the structural members. One side of the insert includes a U-shaped hook that goes over the top and both sides of a joist. The other side of the insert only includes an L-shaped connection ledge, which goes across the top and one side of the joist. The L-shaped ledge on one side of the insert prevents the inserts from becoming off-center as they are placed side-by-side on joists across the entire width of a deck. Between the connections to the joists is defined a channel consisting of sidewalls and a base. The base is angled along its length such that water captured within the channel will drain from one end of the insert to the other. In one embodiment, the difference in elevation of the base of the channel will be a drop of at least ¼ inch per foot. However, the amount of drop or slope of the base of the channel may be of any configuration that enables water to drain from one end of the insert to the other. The width of the insert may be designed to any necessary width to accommodate standard widths between joists of a deck, roof or similar structure. Examples of this include 12 inch center joists, 16 inch center joists, 24 inch center joists, or other supporting structures.

In one aspect, an elongate channel insert for directing water between two substantially parallel elongate structural support members includes a first substantially trapezoidal side wall having an upper side, a lower side and substantially parallel first and second ends wherein the lower side of the first side wall tapers away from the upper side from the first end of the first sidewall to the second end of the first sidewall. The channel insert further includes a second substantially trapezoidal sidewall having an upper side, a lower side and substantially parallel first and second ends wherein the lower side of the second sidewall tapers away from the upper side from the first end to the second end of the second sidewall. The upper side, a lower side and substantially parallel first and second ends of the second sidewall are substantially parallel to the respective upper side, lower side and substantially parallel first and second ends of the first sidewall. A bottom wall extends between the bottom sides of the first and second sidewalls along the length of the first and second sidewalls.

To support the channel inserts on the parallel elongate structural support members first and second support members are provided. The first support member extends from the upper side of the first sidewall along the length of the sidewall, and includes a first wall extending substantially perpendicular to the first sidewall. The first support member also includes a second wall extending substantially perpendicular to a first wall toward the lower side of the first sidewall. The second wall has a substantially constant width along the length of the first sidewall, wherein the width of the second wall is less than the width of the first sidewall. The first support member along with the first sidewall defines a substantially "U" or "C" shaped channel configured to fit over an elongate structural member with the first and second walls positioned on adjacent sides of the elongate structural member.

The second support member consists of a flange extending from the upper side of the second sidewall. The flange extends substantially perpendicular to the second sidewall and has a width less than the first wall of the first support member such that a first support member of a second, adjacent elongate channel insert having the same structure as the first channel member can be positioned over the second support member and elongate structural member.

In another aspect, a system for diverting water from an area beneath a structure having substantially parallel elongate structural support members includes a plurality of elongate channel inserts configured to direct water between two of the substantially parallel elongate structural support members. The elongate channel inserts include first and second parallel, substantially trapezoidal sidewalls having upper sides, lower sides and substantially parallel first and second ends wherein the lower sides of the sidewalls taper away from the upper sides of the sidewalls from the first ends of the sidewalls to the second ends of the sidewalls. A bottom wall extends between bottom sides of the first and second sidewalls along the length of the first and second sidewalls. A first support member extends from the upper side of the first sidewall along the length of the sidewall such that the first support member and sidewall form a generally "C" shaped channel for receiving an elongate structural member therein to support a first side of the channel insert. A second support member or flange extends from the upper side of the second sidewall. The flange is substantially perpendicular to the second sidewall such that the sidewall and flange have a generally "L" shaped configuration.

The system includes a tool for forming pilot guide holes through the first and second support members. The tool includes a main base block with first and second guides extending therethrough that are adapted to receive a drill bit to form first and second pilot guide holes through the first and second support members and into the parallel elongate structural support members at predetermined intervals. Fasteners such as screws or nails may be inserted through the first and second guide holes to secure the plurality of channel inserts to the parallel elongate structural support members to divert water from the area beneath the structure. In one embodiment, the tool is configured to form the first guide hole perpendicular to a longitudinal axis of one of the elongate structural support members and the second guide hole at an angle less than ninety degrees relative to the longitudinal axis of the elongate structural support member.

The tool may include a base main block and side plates attached to the base main block such that the base block and sides define a generally "U" shaped channel configured to fit over one of the elongate structural support members such that the first and second guides are centered on the elongate structural support member. In one variation, the side plates are adjustable relative to the base main block such that the width of the generally "U" shaped channel may be changed to conform to elongate structural support members having different widths. When desirable, the tool of the system of may include an angled flange extending from the base main block with one of the of the first and second guides mounted in the angled flange such that the guide mounted in the flange extends at an angle less than ninety degrees relative to the longitudinal axis of the main base block.

BRIEF DESCRIPTION OF THE DRAWINGS

For a more complete understanding, reference is now made to the following description taken in conjunction with the accompanying Drawings in which:

FIG. 1 is a perspective view of a channel insert according to the disclosure;

FIG. 2 is a cross-sectional view of the channel insert of FIG. 1;

DETAILED DESCRIPTION

Figure 3:
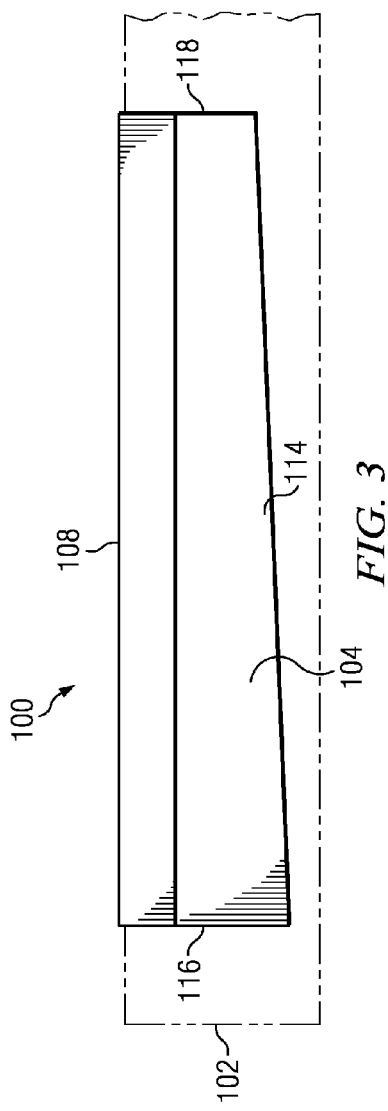
FIG. 3 is a side view of the channel insert of FIG. 1.

Referring now to the drawings, wherein like reference numbers are used herein to designate like elements throughout, the various views and embodiments of a deck drainage system are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

FIG. 1 is a perspective view of an elongate channel insert 100 according to one embodiment. FIG. 2 is a cross-sectional view of the insert 100 of FIG. 1. Channel insert 100 is designed to be installed between substantially parallel elongate structural support members 102 such as deck or roof joists to channel water to a desired location such as a gutter or downspout. Insert 100 may be formed from sheet metal, fiberglass or molded from a suitable plastic. In one embodiment, insert 100 is formed from 24 to 32 gauge steel sheet by means of roll forming or braking a trapezoidal section of the sheet.

FIG. 3 is a side view of the channel insert of FIG. 1. Referring to FIGS. 1-3, as illustrated, insert 100 includes first and second substantially trapezoidal side walls 104, 106 each having an upper sides 108, 110, lower sides 112, 114 and substantially parallel first and second ends 116, 118. In one embodiment, the lower sides 112, 114 and bottom wall 120 of insert 100 taper away from the upper sides 108, 110 from the first ends 116 of the sidewalls to the second ends 118 of the sidewalls. A bottom wall 120 extends between the lower sides 112, 114 of sidewalls 104, 106. In one embodiment, bottom wall 120 tapers toward upper sides 108, 110 of sidewalls 104, 106 at a slope of ¼ inch per foot from first end 116 to second end 118 to facilitate the flow of water through channel insert end 100. Inserts 100 may be designed to any necessary width to accommodate standard widths between structural members such as the joists of a deck. Examples include 12 inch center joists, 16 inch center joists, 24 inch center joists, or other supporting structures.

Insert 100 may be mounted on structural support members 102 with first and second support members 122, 124. As described in greater detail below, first support member 122 along with first sidewall 104 forms a generally "U" or "C" shaped channel or hook for receiving structural member 102 therein. Second support member 124 forms a generally "L" shaped support ledge. First and second support members 122, 124 may be integrally formed as part of insert 100 by roll or otherwise forming a trapezoidal sheet of a suitable metal. In this embodiment, first and second support members 122, 124 extend over the entire length of channel insert 100.

First support member 122 extends from the upper side 108 of the first sidewall 104 continuously along the length of the sidewall. First support member 122 includes a first wall 126 that extends substantially perpendicular to first sidewall 104. First support member 122 also includes a second wall 128 that extends substantially perpendicular to first wall 126 toward the lower side 112 of first sidewall 104. As illustrated, second wall 128 extends continuously along the length of first sidewall and has a substantially constant width along the length of the first sidewall 104; less than the width of the first side wall. As best illustrated in FIG. 1, first support member 122 is configured to fit over elongate structural member 102 with the first and second walls 126, 128 positioned on adjacent sides of the structural member with the structural member between sidewall 104 and second wall 128.

Second support member 124 extends continuously from the upper side 110 of the second sidewall 106 along the length of the second sidewall. Second support member 124 along with second sidewall 106 form a generally "L" shaped channel for receiving a structural member 102. As illustrated, second support member 124 is only a flange 130 that extends substantially perpendicular to second sidewall 106 and has a width less than first wall 126 of the first support member 122.

Figure 4:
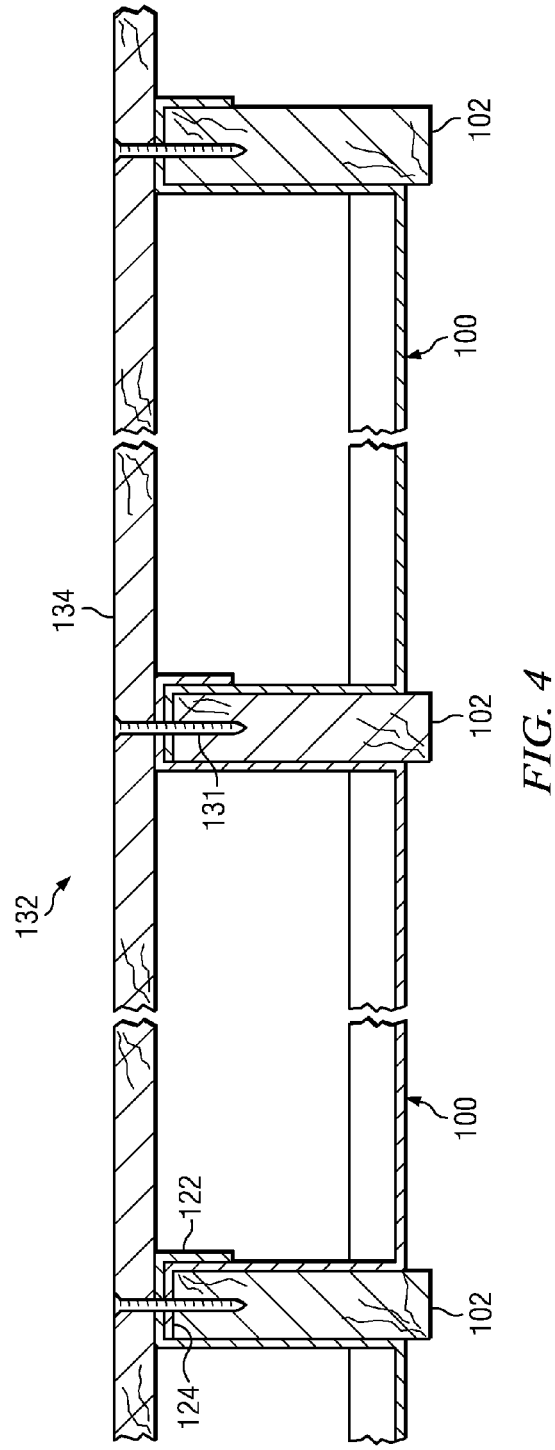
FIG. 4 is an end view of a plurality of channel inserts positioned on elongate structural members.
Figure 5:
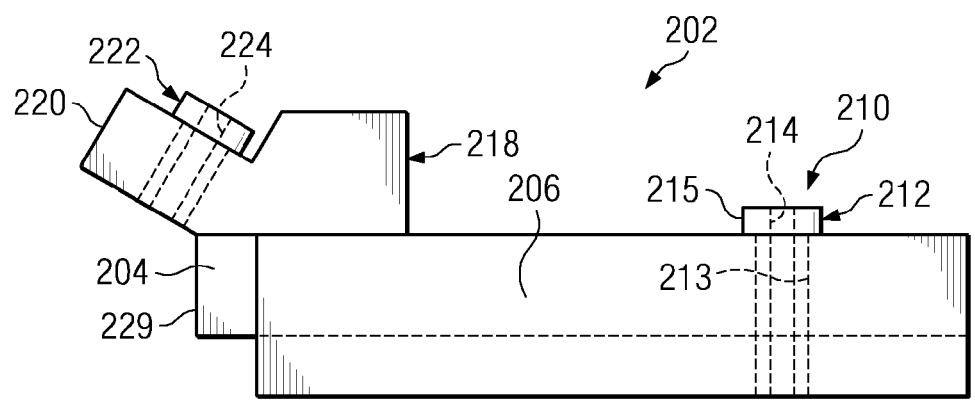
FIG. 5 is a side view of a pilot hole guide utilized in one embodiment of a system according to the disclosure.
Figure 6:
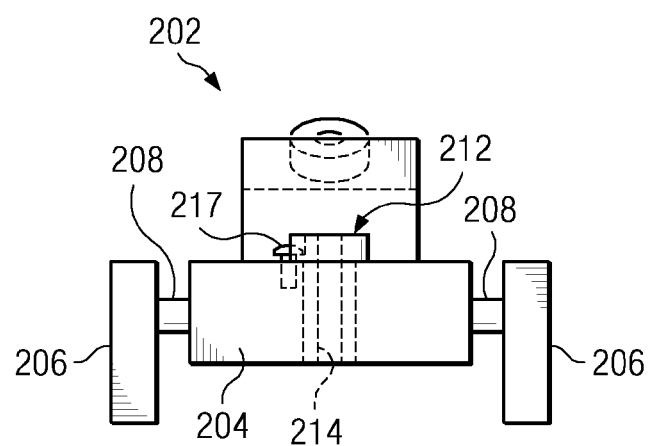
FIG. 6 is an end view of the pilot hole guide of FIG. 5.
Figure 7:
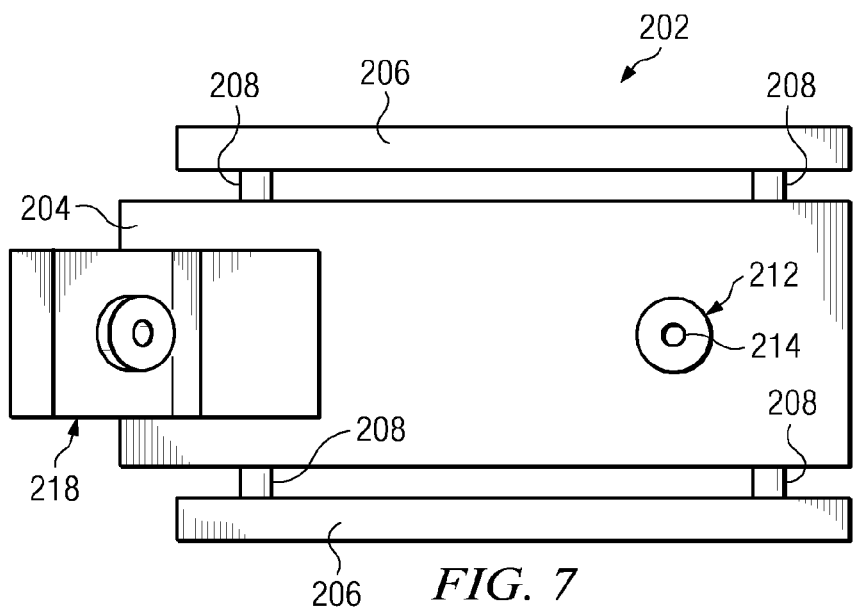
FIG. 7 is a top view of the pilot hole guide of FIG. 5.
Figure 8:
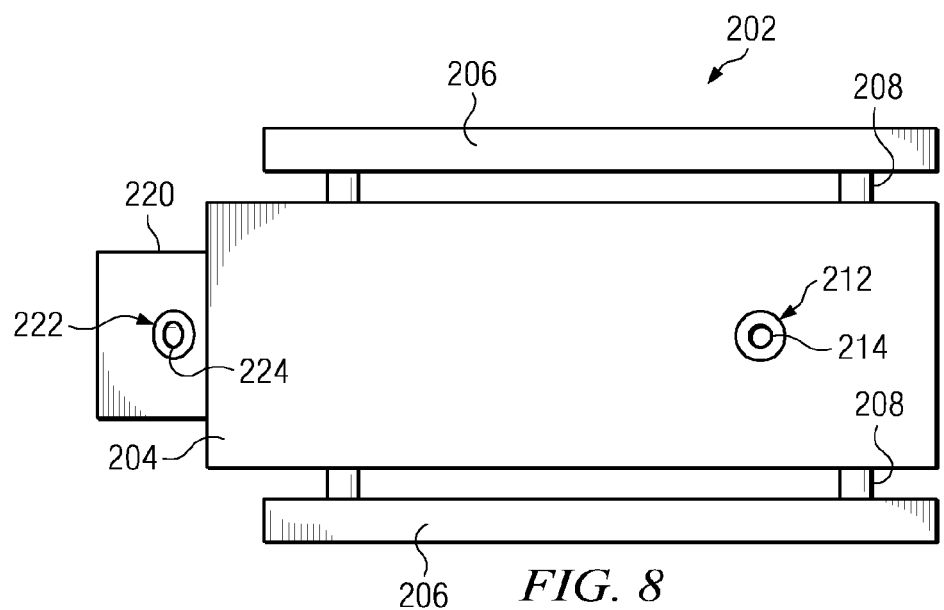
FIG. 8 is a bottom view of the pilot hole guide of FIG. 5.

FIG. 4 is an end view of a plurality of channel inserts 100 positioned on structural members 102. As illustrated, the cross-sectional geometry of inserts 100 permits a first support member 122 to be positioned over second support member 124 and elongate structural member 102. Channel inserts 100 may be attached to structural support members 102 with conventional fasteners 131 such as nails or screws. As illustrated, fasteners 131 extend through the upper surfaces of support members 122 and 124. This feature tends to prevent leakage of water through an overlying structure such as a deck or roof between channel inserts 100.

Referring still to FIG. 4, in one embodiment, inserts 100 are positioned between the support joists 102 of an outdoor deck 132 prior to placing the decking boards 134 across the joists that to render the space below the deck dry and enclosed. Inserts 100 may be of any length to extend from one edge of an associated building to the edge of deck 132. Inserts 100 are placed upon joists 102 of deck 132 during construction prior to placement of the decking boards 134 or other decking surface upon the joists. Inserts 100 are placed such that water flowing between decking boards 134 will drain along the defined channels from the area closest to the house or other structure out toward the edge of the deck. This enables the creation of a dry area below the surface of deck 132 as water will no longer drip between the decking surfaces 134 into the area below the decking.

When connecting metal channel inserts as 100 described herein above to the decking joist of a deck or other structural member as illustrated in FIG. 4, it may be necessary to place fasteners such as screws or nails through the decking material. Providing pilot holes to install the fasteners tends to reduce the possibility of splitting the decking material, especially in the case of natural or composite deck boards. However, in some instances the pilot hole may have to be drilled through the decking material, the channel insert and into the joist or structural member at an angle. For example, if the decking material is tongue and groove boards, the fasteners may have to be angled into the joist or other structural member as the boards are installed.

However, when engaging a metal, fiberglass or plastic channel insert 100 with the tip of a drill bit at an angle, the tip of the drill bit may "walk" or slide along the surface or the insert. Further, if a pilot hole is drilled off-center and/or at the edge of channel insert 100, water may leak between the decking material and through the pilot hole in the channel insert.

Referring now to FIGS. 5-8, there are illustrated a side view (FIG. 5), and end-view (FIG. 6), a top view (FIG. 7) and a bottom view (FIG. 8) of a pilot hole guide that may be used upon a decking joist in order to drill the pilot holes necessary for attaching the decking material to a decking joist.

The pilot hole guide 202 consists of a main base block 204 which may be a rectangular block that rests on top of a joist when the pilot hole guide is utilized. Connected to each edge of the main body block 204 are side plates 206. The side plates 206 are connected to the main body block 204 and separated therefrom by adjustable spacers or connectors 208. The side plates 206 and the main body block 204 define a "U" or "C" shaped guide enabling the pilot hole guide 202 to be placed and centered on the top of a decking joist or similar structural member. The adjustable spacers 208 enable the side plates 206 to be moved outward from or inward towards the main body block 204 to accommodate differing widths of decking joists or similar elongate structural members.

The main body block 204 includes therein a main hole guide 210 centered on the longitudinal axis of the main body block. The main hole guide 210 consists of a metal insert 212 that includes a body that is inserted through an aperture 213 within and through the main body block 204 and a head 215 that enables the insert to be fixable connected to the main body block 204. The insert 212 may be threaded into the main body block 204 or includes some type of external connector to connect the insert 212 to the main body block 204. In one embodiment, insert 212 comprises a slip-type removable drill bushing that is secured in aperture 213 with a cap head or similar screw 217 that engages head 215 to secure the insert in place in main body block 204.

Figure 9:
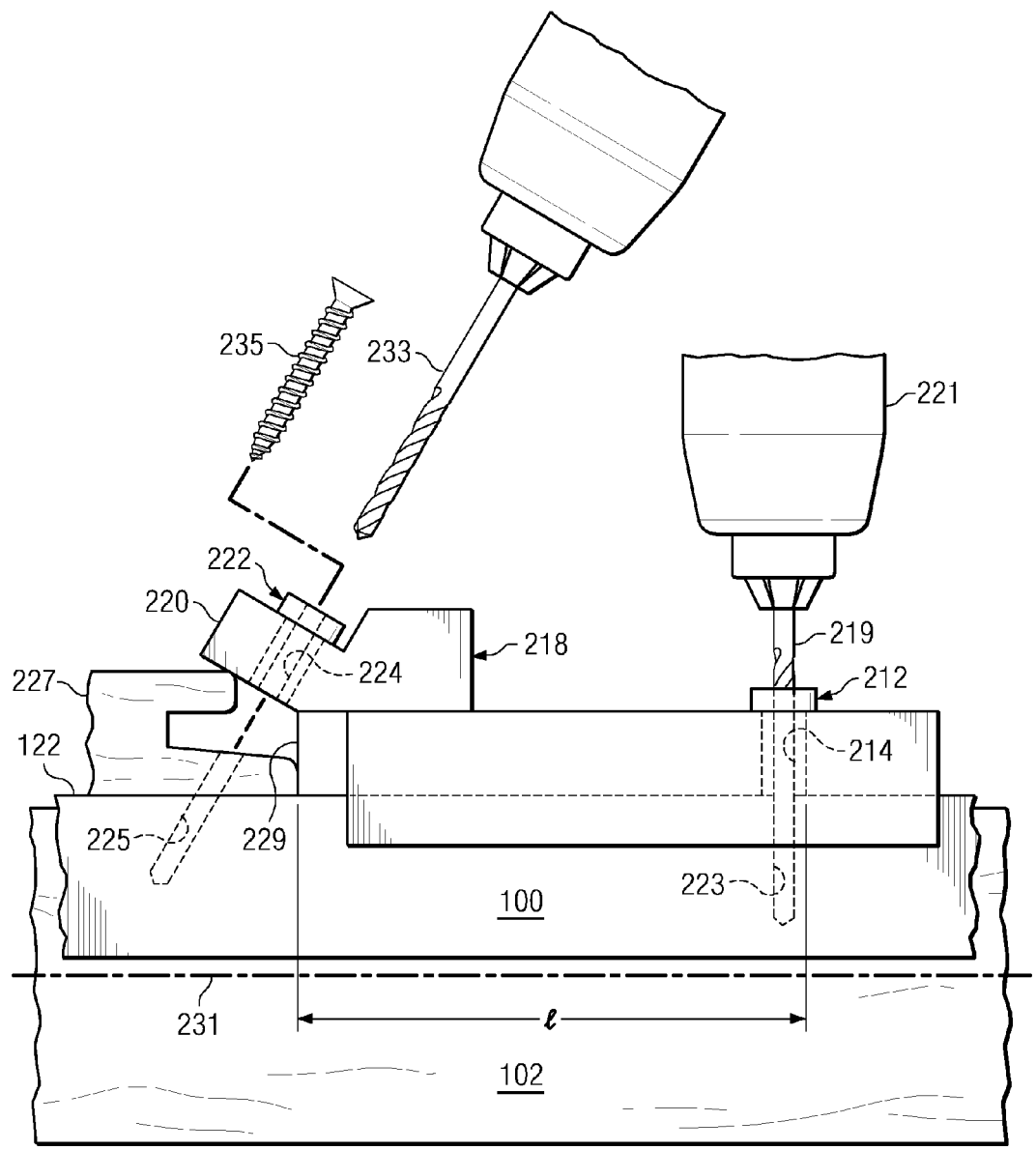
FIG. 9 is a partial cut-away view of the pilot hole guide of FIG. 5 illustrating the guide in use.

FIG. 9 is a side view illustrating the use of pilot hole guide 202. Insert 212 defines a first drill guide hole 214 through the center thereof substantially perpendicular to the longitudinal axis of the base block 204 of pilot hole guide 202. As illustrated, pilot hole guide 202 is positioned over first and second support members 122, 124 of adjacent channel inserts 100 which have been placed over structural member 102 as shown in FIG. 3. The bit 219 of drill 221 is inserted into and through first drill guide hole 214 to drill a first pilot hole 223 at a 90° angle into structural member 102. Since bit 219 engages first and second support members 122, 124 at a 90° angle, the tendency of drill bit 219 to slip along the support members is minimized. Further, since pilot hole guide 202 and insert 212 are centered on structural member 102 the resulting first pilot hole will be made into the center of structural member 102 reducing the possibility of an off center hole through first and second support members 122, 124 that could result in leakage.

Referring still to FIG. 9, a second pilot hole 225 is drilled at an angle into the structural member 102 through the angled pilot hole guide block 218. Angled pilot hole guide block 218 is connected to the main body block 204 and defines a hole guide flange 220, through which a second hole guide insert 222 is placed. The hole guide insert 222 is inserted through a hole defined in the flange 220 and consists of a body portion inserted through the hole and a head that prevents the insert 222 from passing through the hole. The insert 222 also defines a hole 224 in the center thereof through which a drill bit 233 may be inserted to drill second hole 225 at an angle relative to the longitudinal axis 231 of structural member 102.

Insert 222 may also be removed and replaced with another insert in order to accommodate differing drill bit sizes. The insert 222 may be threaded into the flange 220 or secured thereto by some other type of securing mechanism. In one embodiment, insert 222 comprises a slip-type removable drill bushing that is secured in flange 220 with a cap head or similar screw that engages the head of the insert to secure the insert in the flange.

The angle defined by the flange 220 is selected to secure the decking material and channel insert to the structural member 102. In the illustrated embodiment, the decking material is tongue and groove decking boards 227 (one shown) that extend substantially perpendicular to support members 102. In order to secure boards 227 to structural member 102, it may be preferable to use fasteners such as screws or nails inserted at an angle through a portion of the tongue of the board to avoid having the heads of the fasteners exposed on top of the boards and to prevent the fasteners from loosening over time. In this embodiment, flange 220 and insert 222 extend at angles less than ninety degrees relative to the longitudinal axis of main body block 204 with insert 222 perpendicular to flange 220.

In one embodiment, tool 202 is configured and dimensioned such that when the leading edge 229 of main body block 204 is registered against board 227, hole 224 of insert 222 is aligned with a hole 223 previously drilled through first and second support members 122 and 124. In this embodiment, the angle of the hole 224 defined by the flange 220 enables a drill bit placed through the hole 224 to engage the upper end of hole 223 previously drilled through insert 212. The placement of the pilot hole guide caused by the leading edge of 229 of main body block 204 engaging board 227 enables the engagement of drill bit 233 into the previously drilled pilot hole 223. It will further be appreciated that the length l between the leading edge 229 of main body block 204 and insert 212 may be varied depending upon the particular decking material used. For example, in the case where the decking material is tongue and grove boards the distance l may be varied based on the width of the boards.

Referring still to FIG. 9, once the pilot hole guide 202 is placed against the edge of the decking material 227, the first pilot hole 223 may be drilled through first and second support members 122 and 124 of adjacent channel inserts 100 and decking material 227 using the guide hole 214. In one variation, hole 223 will have a larger radius to enable drill bit 233 to engage the second pilot hole 225 to be drilled through the upper end of first hole 223 at an angle into the structural member 102 at an angle. After second pilot hole 225 a fastener such as screw 235 may be inserted into the pilot hole to secure board 227 along with first and second support members 122, 124 of adjacent channel inserts 100 to structural member 102.

It will be appreciated by those skilled in the art having the benefit of this disclosure that this deck drainage system provides a channel insert, pilot tool, system and method for draining water from structures such as decks, roofs and similar structures. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. An elongate channel insert for directing water between two substantially parallel elongate structural support members, the elongate channel member comprising:
    a first substantially trapezoidal sidewall having an upper side, a lower side and substantially parallel first and second ends, wherein the lower side of the first sidewall tapers away from the upper side from the first end of the first sidewall to the second end of the first sidewall;
    a second substantially trapezoidal sidewall having a upper side, a lower side and substantially parallel first and second ends wherein the lower side of the second sidewall tapers away from the upper side from the first end to the second end of the second sidewall;
    a bottom wall extending between the bottom sides of the first and second sidewalls along the length of the first and second sidewalls and defining a single planer surface between the bottom sides of the first and second sidewalls, wherein the bottom wall is substantially perpendicular to the first and second sidewalls;
    a first support member extending from the upper side of the first sidewall along the first length of the first sidewall, the first support member comprising:
        a first plate perpendicular to the upper side of the first sidewall and having a width substantially equal to a width of the structural support member;
        a second plate perpendicular to the first plate and extending along a lateral surface of the structural support member;
    a second support member extending from the upper side of second sidewall along the length of the second sidewall, the second support member comprising:
        a third plate perpendicular to the upper side of the second sidewall and having a width no greater than a width of the structural support member;
    wherein the first and second support members are configured to rest on elongate structural support members of a structure such that water entering the channel insert is diverted from beneath the structure;
    wherein the first support member fits over the second support member to secure an edge of the elongate channel to the structural support member;
    wherein the first substantially trapezoidal sidewall and the second substantially trapezoidal sidewall are parallel to the two substantially parallel elongated structural support members; and
    wherein the first substantially trapezoidal sidewall is substantially adjacent to a first structural support member and the second substantially trapezoidal sidewall is substantially adjacent to a second structural support member.

2. The channel insert of claim 1, wherein the channel insert is formed from a single piece of sheet metal.

3. The channel insert of claim 1, wherein the channel insert is formed from a single, trapezoidal piece of sheet metal.

4. The channel insert of claim 1, wherein the bottom wall of the channel insert tapers at a rate of ¼ inch per foot from the first end to the second end of the channel insert.

5. A system for diverting water from an area beneath a structure having substantially parallel elongate structural support members, the system comprising:
    a plurality of elongate channel inserts configured to direct water between two of the substantially parallel elongate structural support members, the elongate channel members comprising:
        a first substantially trapezoidal side wall having an upper side, a lower side and substantially parallel first and second ends wherein the lower side of the first side wall tapers away from the upper side from the first end of the first sidewall to the second end of the first sidewall;
        a second substantially trapezoidal side wall having a upper side, a lower side and substantially parallel first and second ends wherein the lower side of the second sidewall tapers away from the upper side from the first end to the second end of the second sidewall wherein the upper side, a lower side and wherein the substantially parallel first and second ends of the second sidewall are substantially parallel to the respective upper side, lower side and substantially parallel first and second ends of the first sidewall;
        a bottom wall extending between the bottom sides of the first and second sidewalls along the length of the first and second sidewalls;
        a first support member extending from the upper side of the first sidewall along the length of the sidewall the first support member and sidewall having a "C" shaped configuration;
        a second support member extending from the upper side of second sidewall, the second support member and second sidewall having a generally "L" shaped configuration; and
    a tool for forming pilot guide holes through the first and second support members, the tool having a main base block with first and second guides extending therethrough and adapted to receive a drill bit to form first and second pilot guide holes through the first and second support members and into the parallel elongate structural support members at predetermined intervals whereby fasteners inserted into the first and second guide holes secure the plurality of channel inserts to and between the parallel elongate structural support members to divert water from the area beneath the structure.

6. The system of claim 5 wherein the tool is configured to form the first guide hole perpendicular to a longitudinal axis of one of the elongate structural support members and the second guide hole at an angle less than ninety degrees relative to the longitudinal axis of the elongate structural support member.

7. The system of claim 5 wherein the tool comprises:
    a main base block;
    side plates attached to the main base block such that the base block and sides define a generally "U" shaped channel configured to fit over one of the elongate structural support members such that the first and second guides are centered on the elongate structural support member.

8. The system of claim 7, wherein the side plates are adjustable relative to the main base block such that the width of the generally "U" shaped channel may be changed to conform to elongate structural support members having different widths.

9. The system of claim 7 further comprising an angled flange extending from the base main block and wherein one of the first and second guides is mounted in the angled flange such that the guide mounted in the flange extends at an angle less than ninety degrees relative to the longitudinal axis of the main base block.

10. The system of claim 9, wherein the guide mounted in the angled flange is perpendicular to the flange.

11. The system of claim 5, wherein the first support member extends from the upper side of the first sidewall along the length of the sidewall, the first support member having a first wall extending substantially perpendicular to the first sidewall, the first support member having a second wall extending substantially perpendicular to first wall toward the lower side of the first sidewall, the second wall having a substantially constant width along the length of the first sidewall, wherein the width of the second wall is less than the width of the first side wall and wherein the first support member is configured to fit over an elongate structural member with the first and second walls positioned on adjacent sides of the elongate structural member.

12. The system of claim 5, wherein the second support member extends from the upper side of the second side wall, the second support comprising only a flange extending substantially perpendicular to the second sidewall and wherein the flange has a width less than the first wall of the first support member such that a first support member of a second, adjacent elongate channel insert having the same structure as the first channel insert can be positioned over the second support member and elongate structural member.

13. A system for diverting water from an area beneath a structure having substantially parallel elongate structural support members, the system comprising:
   a plurality of elongate channel inserts configured to direct water between two of the substantially parallel elongate structural support members, the elongate channel members comprising:
      a first substantially trapezoidal side wall having an upper side, a lower side and substantially parallel first and second ends wherein the lower side of the first side wall tapers away from the upper side from the first end of the first sidewall to the second end of the first sidewall;
      a second substantially trapezoidal side wall having a upper side, a lower side and substantially parallel first and second ends wherein the lower side of the second sidewall tapers away from the upper side from the first end to the second end of the second sidewall wherein the upper side, a lower side and wherein the substantially parallel first and second ends of the second sidewall are substantially parallel to the respective upper side, lower side and substantially parallel first and second ends of the first sidewall;
   a bottom wall extending between the bottom sides of the first and second sidewalls along the length of the first and second sidewalls;
   a first support member extending from the upper side of the first sidewall along the length of the first sidewall, the first support member, comprising:
      a first plate perpendicular to the upper side of the first sidewall and having a width substantially equal to a width of the structural support member;
      a second plate perpendicular to the first plate and extending along a lateral surface of the structural support member;
   a second support member extending from the upper side of second sidewall, along the length of the second sidewall, the second support member, comprising:
      a third plate perpendicular to the upper side of the second sidewall and having a width no greater than a width of the structural support member;
   wherein the first support member fits over the second support member to secure an edge of the elongate channel to the structural support member;
   a tool for forming pilot guide holes through the first and second support members, the tool having a main base block with first and second guides extending therethrough and adapted to receive a drill bit to form first and second pilot guide holes through the first and second support members and into the parallel elongate structural support members at predetermined intervals whereby fasteners inserted into the first and second guide holes secure the plurality of channel inserts to and between the parallel elongate structural support members to divert water from the area beneath the structure, wherein the tool is configured to form the first guide hole perpendicular to a longitudinal axis of one of the elongate structural support members and the second guide hole at an angle less than ninety degrees relative to the longitudinal axis of the elongate structural support member.

* * * * *